United States Patent
Malinin et al.

(10) Patent No.: US 10,230,303 B2
(45) Date of Patent: Mar. 12, 2019

(54) ISOLATED SWITCHING POWER CONVERTER WITH DATA COMMUNICATION BETWEEN PRIMARY AND SECONDARY SIDES

(71) Applicant: Dialog Semiconductor Inc., Campbell, CA (US)

(72) Inventors: Andrey Malinin, Fort Collins, CO (US); John Kesterson, Seaside, CA (US)

(73) Assignee: Dialog Semiconductor, Inc., Campbell, CA (US)

( * ) Notice: Subject to any disclaimer, the term of this patent is extended or adjusted under 35 U.S.C. 154(b) by 0 days.

(21) Appl. No.: 15/595,324

(22) Filed: May 15, 2017

(65) Prior Publication Data

US 2017/0250612 A1    Aug. 31, 2017

Related U.S. Application Data

(63) Continuation of application No. PCT/US2015/036682, filed on Jun. 19, 2015.

(30) Foreign Application Priority Data

Nov. 27, 2014 (GB) .................... 1421055.3

(51) Int. Cl.
*H02M 3/335* (2006.01)
*H02M 1/32* (2007.01)
(Continued)

(52) U.S. Cl.
CPC ......... *H02M 3/33507* (2013.01); *H02M 1/32* (2013.01); *H02M 3/285* (2013.01);
(Continued)

(58) Field of Classification Search
CPC ......... H02M 3/33507; H02M 3/33523; H02M 3/335; H02M 3/33515; H02M 3/33592;
(Continued)

(56) References Cited

U.S. PATENT DOCUMENTS 8,854,842 B2   10/2014   Zheng
2010/0165672 A1   7/2010   Li et al.
(Continued)

FOREIGN PATENT DOCUMENTS

EP    2 717 450    4/2014

OTHER PUBLICATIONS

"A Low-Cost Adaptive Multi-Mode Digital Control Solution Maximizing AC/DC Power Supply Efficiency," by Young Li & Jerry Zheng, iWatt Inc., Los Gatos, CA 95032, APEC Presentation, Feb. 24, 2010, 18 pgs.
(Continued)

*Primary Examiner* — Jue Zhang
*Assistant Examiner* — Kevin H Sprenger
(74) *Attorney, Agent, or Firm* — Saile Ackerman LLC; Stephen B. Ackerman

(57) ABSTRACT

An isolated switching power converter is provided wherein a secondary side is valley mode switched to transmit data to a primary side. This provides secondary side regulation without the need for an optocoupler. Data communication between the primary and secondary sides of switching power converters is presented.

20 Claims, 6 Drawing Sheets

(51) Int. Cl.
    *H02M 3/28*     (2006.01)
    *H02M 7/00*     (2006.01)
    *H02M 1/00*     (2006.01)

(52) U.S. Cl.
    CPC ... *H02M 3/33523* (2013.01); *H02M 3/33592* (2013.01); *H02M 7/003* (2013.01); *H02M 2001/0003* (2013.01); *Y02B 70/1475* (2013.01)

(58) Field of Classification Search
    CPC ......... H02M 3/33576; H02M 3/33561; H02M 3/33569; H02M 3/1563; H02M 3/3385; H02M 1/32; H02M 1/4258; H02M 2001/0032; Y02B 70/126; Y02B 70/1475; Y02B 70/16
    USPC ............................................ 363/21.12–21.18
    See application file for complete search history.

(56) References Cited

U.S. PATENT DOCUMENTS

| | | | | |
|---|---|---|---|---|
| 2013/0121049 | A1* | 5/2013 | Shi | H02M 3/33507 363/89 |
| 2013/0235621 | A1 | 9/2013 | Yan et al. | |
| 2014/0098578 | A1* | 4/2014 | Halberstadt | H02M 3/33515 363/21.15 |
| 2014/0098579 | A1* | 4/2014 | Kleinpenning | H02M 3/33523 363/21.17 |
| 2014/0160810 | A1 | 6/2014 | Zheng | |
| 2015/0280573 | A1* | 10/2015 | Gong | H02M 3/33523 363/21.14 |
| 2016/0365796 | A1* | 12/2016 | Lee | H02M 3/33523 |

OTHER PUBLICATIONS

"Flyback Topology—Quasi Resonant Switching Benefits," Cambridge Semiconductor Ltd 2010, BN-3243-0814, Jun. 13, 2011, 2 pgs.

"PFC THD Reduction and Efficiency by ZVS or Valley Switching," Texas Instruments, Bosheng Sun, Zhong Ye, Application Report—SLUA644—Apr. 2012, 15 pgs.

"Exposing the Inner Behavior of a Quasi-Resonant Flyback Converter," 2012 Texas Instruments Power Supply Design Seminar, SEM200, Topic 3, TI Literature No. SLUP302, © 2012, 2013 Texas Instruments Incorporated, 27 pgs.

"Valley Current Mode Control Buck Converter," Allegro MicroSystems, LLC, 4403-DS, Rev.2, Jun. 17, 2013, 16 pgs.

* cited by examiner

ISOLATED SWITCHING POWER CONVERTER WITH DATA COMMUNICATION BETWEEN PRIMARY AND SECONDARY SIDES

TECHNICAL FIELD

The present disclosure relates to the field of isolated switching power converters and in particular to those which have data communication between their primary and secondary sides.

BACKGROUND

An isolated switching power converter provides regulated power to an electronic device while providing galvanic isolation between the electronic device and an AC power source. Typically an isolated switching power converter comprises a transformer which comprises a primary winding coupled with the AC power source and a secondary winding coupled with an output of the converter circuit. The transformer provides galvanic isolation, and components which are coupled with the primary winding are collectively referred to as the primary side of the power converter circuit, while components which are coupled with the secondary winding are collectively referred to as the secondary side of the power converter circuit. The output provides a regulated voltage for an output load, which may comprise an electronic device.

A power stage switch is provided at the primary side which controls the delivery of energy to the output load. In the switch's first (closed) state, the primary winding is connected with the input voltage source and current is generated in the primary winding. Energy is stored in the transformer and an output capacitor or equivalent storage element in the secondary side delivers energy to the load. In the switch's second (open) state, no current flows in the primary winding. The energy stored by the transformer charges the storage element in the secondary side and supplies the load.

The primary side comprises a controller for operating the power stage switch. To achieve effective control it is necessary to provide a signal related to the output voltage to the primary side. In secondary side regulation, an optocoupler is provided which feeds back the secondary side output voltage to the primary side. However, an optocoupler takes up space, increases the cost of the circuit and can be unreliable. Another issue with the optocoupler based communication is the relatively low speed. Even though high speed safety isolated transmitter-receiver pairs are available on the market; they are prohibitively expensive for low cost consumer devices such as wall charger adapters.

In primary side regulation, an auxiliary winding is provided at the primary side and the voltage across the auxiliary winding reflects the voltage across the secondary winding. An optocoupler is therefore not required, thus making primary side regulation attractive as it avoids the extra expense, cost and reliability issues.

However, it is often desirable to communicate data from the secondary side to the primary side. An example where this is advantageous is the field of chargers which provide high speed charging. Rapid charging rates require careful monitoring of various parameters such as battery terminal voltage and battery temperature to prevent overcharging and damage to the battery cells, due to the relatively higher currents involved.

Data communication is also useful in other power conversion systems that need to quickly adjust the output regulation points for other reasons than for rapid charging. Examples include wireless charging, or generally any technology where regulation feedback from the secondary side to the primary side is required.

A communication link could also be used to provide other data to the primary side controller, such as determining which specific electronic device is connected to the power supply, determining the operational characteristics of a connected electronic device including, for example, the operating voltage level, current level, and/or operating mode (for example, shut-down mode, sleep mode, hibernation mode). The switching power converter may then adapt its switching operation to achieve different regulated output voltage and/or current to accommodate the detected electronic device and/or its operating mode. With such communication ability, the switching power converter can provide additional functionality, including the ability to accommodate a wide variety of different electronic devices.

Secondary side regulation already provides means for such communication via the optocoupler. However standard primary side regulation does not provide any way for such communication to take place. It is desirable to avoid the use of an optocoupler if possible because it represents a large overhead in terms of die area and cost.

It has been suggested, in U.S. Pat. No. 8,854,842, to provide a switch and a controller at the secondary side. The switch is operated in a dedicated messaging mode and during a dead time period. It switches on and off to cause voltage fluctuations across the secondary winding that are transferred to the primary side. The switching pattern is chosen to encode data to be input to the controller at the primary side.

The scheme of U.S. Pat. No. 8,854,842 relies on the ringing periods of the sensed voltages having subsided. This reduces the time during which data can be transmitted. However it is not practical to wait until the ringing subsides in any of the load conditions except for a no load mode. Whenever there is a significant load, primary side valley mode switching turns on the next switch cycle well before the ringing is subsided. Without doing this, it is not practical to deliver the power. The encoding of data will also be subject to error if ringing is persisting at the time when the switching is taking place.

SUMMARY

There is a need to provide improved way of communicating data from secondary to primary sides of a primary side regulated isolated switched mode power supply.

According to a second aspect of the disclosure there is provided an isolated switching power converter wherein a secondary side is valley mode switched to transmit data to a primary side.

Optionally, the isolated switching power converter comprises:
  a transformer including a primary winding coupled to an input and a secondary winding coupled to an output of the isolated switching power converter;
  a primary side switch coupled to the primary winding of the transformer, wherein the primary side switch allows current flow through the primary winding of the transformer when the primary side switch is turned on, and wherein the primary side switch prevents current flow through the primary winding of the transformer when the primary side switch is turned off;

a secondary side switch coupled to the secondary winding of the transformer, wherein the secondary side switch allows current flow through the secondary winding of the transformer when the secondary side switch is turned on, and wherein the secondary side switch prevents current flow through the secondary winding of the transformer when the secondary side switch is turned off;

a secondary side controller on the secondary side of the switching power converter which outputs a control signal for operating the secondary side switch;

a primary side controller on the primary side of the switching power converter which outputs a control signal for operating the primary side switch;

wherein:

the secondary side controller monitors voltage across the secondary side switch and changes the state of the secondary side switch at a time corresponding to a transformer ringing valley, for the transmission of data to the primary side controller; and the primary side controller monitors valley periods to receive data thus encoded by the secondary side controller.

Optionally, the secondary side switch is coupled in parallel with a rectifier device.

Optionally, the change of state of the switch is maintained for a period of time to represent a data bit; and different valleys are selected to represent different bit values.

Optionally, the change of state of the switch after a first-detected valley represents a bit having a first logic value and the change of the switch after a second-detected valley represents a bit having the other logic value.

Optionally, the secondary side controller waits until the primary side controller allows a full transformer ring to take place before changing the state of the secondary side switch.

Optionally, upon receiving a pulse from the secondary side, the primary side controller disables valley hop dithering until the remaining digital bits have been received.

Optionally, the primary side controller determines an end of message if a predetermined number of bits are received, or if no bits are received after a certain number of transformer ringing cycles.

Optionally, the secondary side is arranged to receive a wake up signal to trigger communication of data to the primary side.

Optionally, the wake up signal causes ringing by pulsing of a secondary side transformer, which in turn causes the primary side controller to commence a power conversion cycle.

Optionally, the isolated switching power converter comprises a flyback converter.

According to a first aspect of the disclosure there is provided a method of transmitting data from a secondary side to a primary side in an isolated switching power converter by valley mode switching of the secondary side.

Optionally, the isolated switching power converter comprises a transformer including a primary winding coupled to an input and a secondary winding coupled to an output of the isolated switching power converter; and the method comprises:

controlling a primary side switch to selectively allow current to flow through the primary winding of the transformer;

controlling a secondary side switch to selectively allow current to flow through the secondary winding of the transformer;

monitoring voltage across the secondary side switch;

changing the state of the secondary side switch at a time corresponding to a transformer ringing valley, for the transmission of data to the primary side controller; and monitoring voltage across the primary side switch to receive data thus encoded by the secondary side controller.

Optionally, the secondary side switch is coupled in parallel with a rectifier device.

Optionally, the method comprises maintaining the change of the state of the switch for a period of time to represent a data bit; and selecting different valleys to represent different bit values.

Optionally, the change of state of the switch after a first-detected valley represents a bit having a first logic value and the change of the switch after a second-detected valley represents a bit having the other logic value.

Optionally, the secondary side controller waits until the primary side controller allows a full transformer ring to take place before changing the state of the secondary side switch.

Optionally, upon receiving a pulse from the secondary side, the primary side controller disables valley hop dithering until the remaining digital bits have been received.

Optionally, the primary side controller determines an end of message if a predetermined number of bits are received, or if no bits are received after a certain number of transformer ringing cycles.

Optionally, the secondary side receives a wake up signal to trigger communication of data to the primary side.

Optionally, the wake up signal causes ringing by pulsing of a secondary side transformer, which in turn causes the primary side controller to commence a power conversion cycle. Optionally, the isolated switching power converter comprises a flyback converter.

BRIEF DESCRIPTION OF THE DRAWINGS

The disclosure will be described below, by way of example only, with reference to the accompanying drawings, in which.

DESCRIPTION

Figure 1:
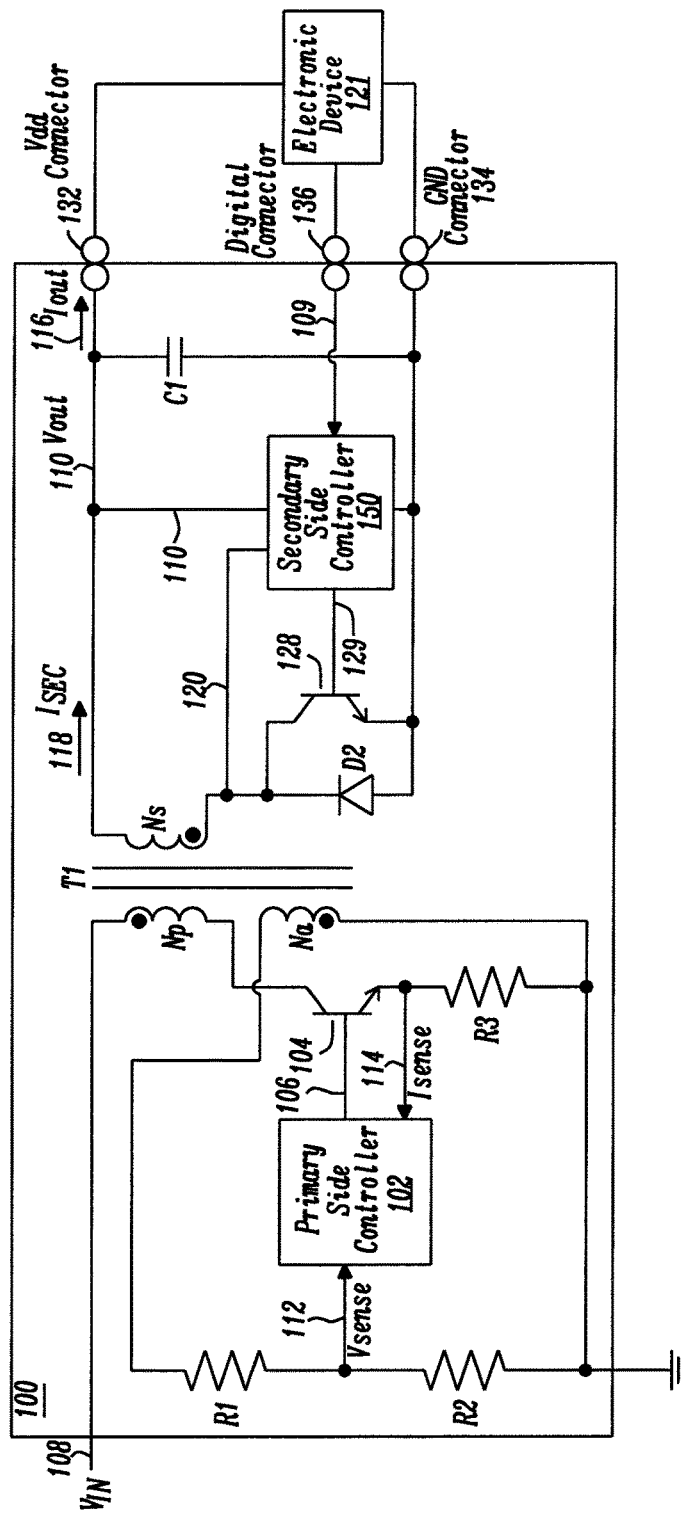
FIG. 1 shows a flyback converter with primary side regulation and which can be operated according to the present disclosure.

One type of isolated switching power converter is a flyback converter. An embodiment of a flyback converter with primary side regulation and which can be operated according to the present disclosure is illustrated in FIG. 1.

The converter 100 provides power to an electronic device 121 via a Vdd connector 132 and a GND connector 134. The switching power converter 100 includes, among other components, a transformer T1 having a primary winding Np, a secondary winding Ns, and an auxiliary winding Na, a switch 104 (for example, a BJT or MOSFET transistor), a primary side switch controller 102, an output rectifier diode D2, resistors R1, R2, R3, and output filter capacitor C1.

The secondary side architecture of switching power converter 100 includes a secondary side controller 150. This controller 150 may optionally receive a device signal 109 from electronic device 121 via a digital connector 136. Digital connector 136 may comprise, for example, one or more data pins on a Universal Serial Bus (USB) (or similar type connector) between switching power converter 100 and electronic device 121 that also includes Vdd connector 132 and GND connector 134. In alternative embodiments, other types of connectors may be used to provide both power and digital communication between the electronic device 121 and switching power converter 100 via connectors 132, 136, 134.

The digital connector 136 may be for purposes such as USB Fast Charging. The mobile device or other load is able to tell the charger what charging voltage to deliver and at what maximum current level. This digital channel can also be used to provide continuous regulation feedback (commands to increase or decrease the output voltage where the load device looks at what it receives and determines what must be sent).

An input voltage (VIN) 108, typically a rectified AC voltage, is input to power converter 100. It is to be appreciated that a suitable rectifier may be provided as part of an input stage of the power converter. The primary side controller 102 controls the on state and the off state of switch 104 using switch control signal 106 with on-times ($T_{ON}$) and off-times ($T_{OFF}$). The switch control signal 106 may control switching of switch 104 using, for example pulse width modulation (PWM) or pulse frequency modulation (PFM).

When switch 104 is turned on during its on-time, energy is stored in primary side windings Np of transformer T1. The voltage across secondary winding Ns is negative and diode D21 is reverse biased, blocking transfer of energy to electronic device 121. In this state, energy is supplied to electronic device 121 via capacitor C1. When switch 104 is turned off, the energy stored in primary winding Np of transformer T1 is released to the secondary winding Ns of transformer T1. Diode D2 becomes forward biased enabling transfer of energy stored in transformer T1 to electronic device 121 and re-charging capacitor C1.

Resistors R1 and R2 form a voltage divider coupled in series with auxiliary winding Na of transformer T1, and produce sensed voltage ($V_{SENSE}$) 112, which is representative of output voltage ($V_{OUT}$) 110. Resistor R3 is coupled in series with switch 104 to produce a voltage ($I_{SENSE}$) 114 representative of the peak current of the primary side, and is therefore representative of the energy per cycle being delivered to the transformer.

In normal operation, the primary side controller 102 monitors $V_{SENSE}$ 112 and $I_{SENSE}$ 114 and controls switching of switch 104 to maintain a regulated output. For example, in a constant voltage mode (CVM), controller 102 controls switching of switch 104 to maintain $V_{OUT}$ 110 substantially near a desired regulation voltage $V_{REG}$ (for example, within an allowable error range). In a constant current mode (CCM), controller 102 controls switching of switch 104 to maintain $I_{OUT}$ 116 substantially near a desired regulation current $I_{REG}$ (for example, within an allowable error range).

In order to transmit data, the secondary side controller 150 generates a switch control signal 129 for controlling switching of a secondary side switch 128 (which may for example comprise a BJT or MOSFET transistor). This may be based on the device signal 109, if this is provided.

The on and off switching of switch 128 causes voltage fluctuations across secondary winding Ns that approximately follow the sequence of on and off periods of control signal 129. These voltage fluctuations across the secondary winding Ns of power transformer T1 are furthermore transferred to the primary winding Np of power transformer T1 and to the auxiliary winding Na, thus transferring a representation of the digital message to the primary side. The primary-side controller 102 detects the voltage fluctuations across auxiliary winding Na via $V_{SENSE}$ 112 and can interpret the sequence of on and off periods to decode the digital message. Based on the determined control parameters in the digital message, the primary-side controller 102 can control the operation of the power stage switch 104 in order to match the specific regulation parameters and/or operating mode associated with the electronic device 121.

The controllers 102, 150 may use valley mode switching. In this technique, the primary side power switch turns on only when the voltage across the power stage switch 104 is at a minimum point. This improves electromagnetic interference (EMI) performance because the hard switching losses of the switches are minimised. The moment when the power stage switch 104 turns may be determined by detecting auxiliary winding voltage zero crossing point in time and delaying the gate drive signal by ¼ of the ringing period. The valleys on the primary side correspond to the peaks on the secondary side.

Figure 2:
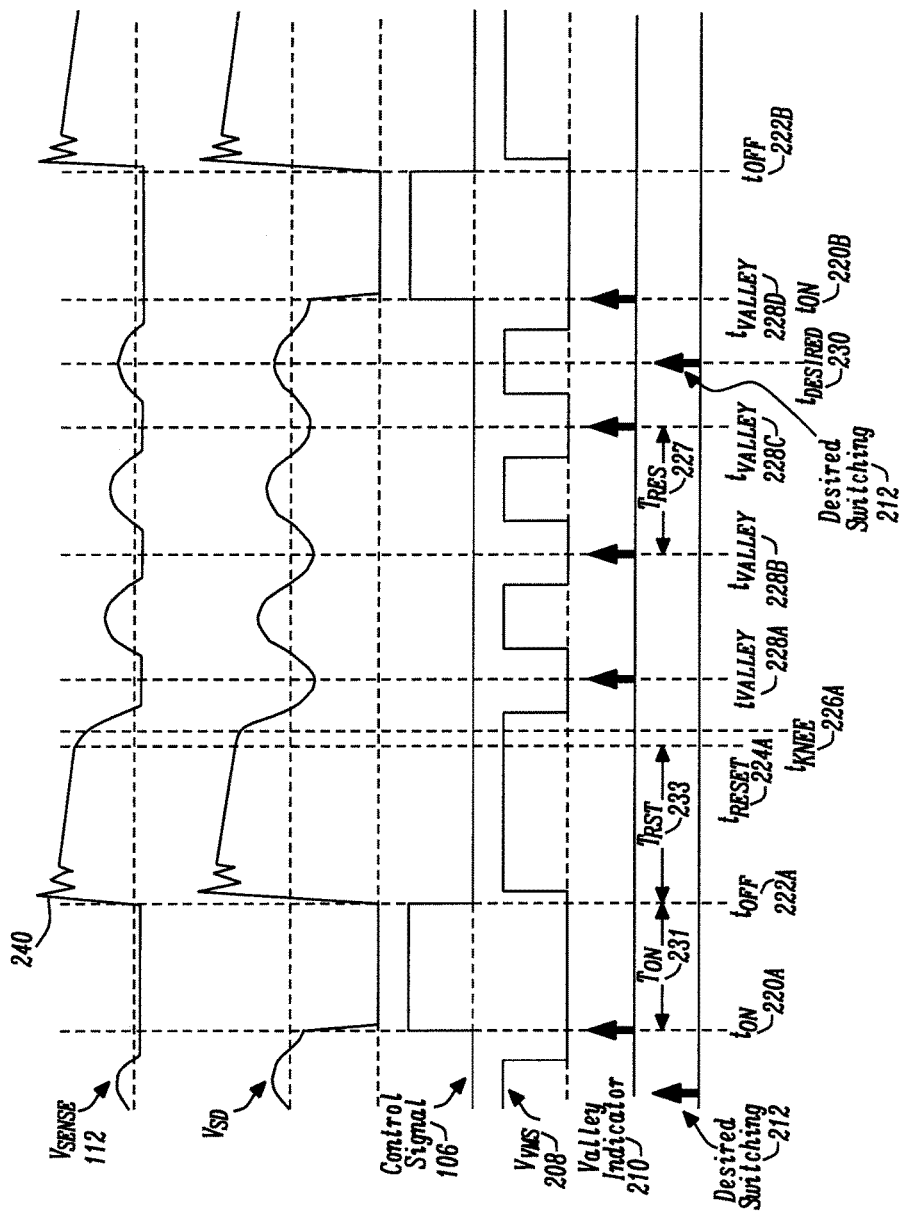
FIG. 2 illustrates aspects of the operation of the circuit of FIG. 1, together with an illustration of an example of a valley mode switching scheme.

The operation of the circuit of FIG. 1, together with an illustration of an example of a valley mode switching scheme, is illustrated in FIG. 2. $V_{SENSE}$ 112 represents the voltage on the $V_{SENSE}$ pin of primary side switch controller 102. $V_{SD}$ represents the voltage across switch 104 (between source and drain in the case of a MOSFET, or corresponding to the voltage between collector and emitter if a BJT is used). $V_{SENSE}$ 112 is substantially proportional to the voltage across the auxiliary winding Na of the transformer T1. $V_{SENSE}$ 1124 and $V_{SD}$ exhibit nearly identical timing characteristics. Control signal 106 represents the voltage on an output pin of primary side switch controller 102. The switch 104 is ON (closed) when control signal 106 is HIGH and the switch 104 is OFF (open) when control signal 106 is LOW. $V_{VMS}$ 208, valley indicator pulses 210, and desired switch pulses 212 are timing signals internal to the primary side controller 102.

At time $t_{ON}$ 220A, the primary side controller 102 generates control signal 106 to be HIGH, turning on (closing) switch 104. Switch 104 remains closed until time $t_{OFF}$ 222A, when control signal 106 becomes LOW pursuant to the operation of the primary side controller 102. The particular timings of $t_{ON}$ 220A and $t_{OFF}$ 222A are determined by the particular control scheme (for example, PWM or PFM) employed in the switching power converter 100. While the switch 104 is closed from time $t_{ON}$ 220A to time $t_{OFF}$ 222A, referred to herein as the ON-time (or ON-period) $T_{ON}$ 231, the rectified DC input voltage $V_{IN}$ 108 is applied to the primary winding Np and the current through the primary winding Np increases. During the ON-time $T_{ON}$ 231, the voltage across the auxiliary winding Na is characterized by the mathematical expression $V_X = -(N_X/N_1)V_{IN}$ wherein $N_X$ is the number of turns for the auxiliary winding Na, $N_1$ is the number of turns for the primary winding Np, $V_{IN}$ is the rectified DC input voltage 108, and $V_X$ is the voltage across the auxiliary winding Na.

At time $t_{OFF}$ 222A, control signal 106 goes LOW, causing switch 104 to open and suddenly interrupting the current through the primary winding Np. The current through the primary winding Np stays at zero until the end of the OFF period of switch 104, that is, until the switch 104 is turned on again at time $t_{ON}$ 220B.

This sudden change in current results in high-frequency parasitic ringing 240 for both $V_{SENSE}$ 112 and $V_{SD}$ immediately following time $t_{OFF}$ 222A. The high-frequency parasitic ringing results from resonance between the transformer leakage inductance and the parasitic capacitance of the switch 104 in parallel with the equivalent parallel parasitic capacitance of the primary winding Np, and typically dies out quickly. After the high-frequency parasitic ringing 240 dies out, $V_{SENSE}$ 112 and $V_{SD}$ remain almost flat until the transformer resets, at time $t_{RESET}$ 224A.

The duration between $t_{OFF}$ 222A and $t_{RESET}$ 224A is referred to herein as the transformer reset period ($T_{RST}$) 233. During the transformer reset period $T_{RST}$ 233, diode D2 conducts and the voltage across the secondary winding Ns approximately equals the output voltage 110 ($V_0$) (the forward voltage drop across diode D2 can be considered negligible for the purpose of illustrative clarity). Accordingly, the voltage across the primary winding Np ($V_1$) can be expressed in terms of the output voltage 110 ($V_0$) as $V_1 = (N_1/N_2)V_0$ and the voltage across the auxiliary winding Na ($V_X$) can be expressed as $V_X = (N_X/N_2)V_0$ wherein $N_1$, $N_2$, and $N_X$ are the number of turns for the primary winding Np, secondary winding Ns, and auxiliary winding Na, respectively. During the transformer reset time $T_{RST}$ 233, $V_{SENSE}$ 112 follows the voltage across the auxiliary winding Na according to the scaling factor set by the voltage divider comprised of resistors R3 and R4. Meanwhile, $V_{SD}$ is given by the expression $V_{SD} = \{(N_1/N_2)V_0\} + V_{IN}$ wherein $V_{IN}$ is again the rectified DC input voltage 108.

The transformer reset time $T_{RST}$ 233 is dictated by the volt-second-balance requirement for resetting the transformer core and can vary between switching cycles based on fluctuations in load and other quantities within the power converter 100. At $t_{RESET}$ 224A (the end of the transformer reset time $T_{RST}$ 233), diode D2 stops conducting, causing the transformer magnetizing inductance and therefore $V_{SENSE}$ 112 and $V_{SD}$ to resonate, a phenomenon referred to herein as transformer ringing. The transformer ringing comprises a decaying sinusoidal signal that is generated when the switch is turned off in each switching cycle. The resonant frequency ($f_{RES}$) and resonant period ($T_{RES}$) 227 of ringing for $V_{SENSE}$ 114 and $V_{SD}$ due to transformer ringing is determined by the parasitic capacitance seen from the switch 104 in parallel with the equivalent parallel parasitic capacitance of the primary winding Np. Due to various damping and loss factors within the power converter 100, $V_{SENSE}$ 112 and $V_{SD}$ are decaying sinusoidal signals with resonant period $T_{RES}$ 227.

The ringing-induced voltage oscillations cause $V_{SENSE}$ 112 and $V_{SD}$ to periodically approach or reach local minimum voltages and local maximum voltages. Times at which $V_{SD}$ reaches a local minimum as a result of transformer ringing are referred to herein as valleys 228A, 228B . . . 228D. For example, FIG. 2 illustrates a first valley 228A, a second valley 228B, a third valley 228C, and a fourth valley 228D. Although four valleys are shown in FIG. 2, there can be more or less than four valleys before the switch is turned ON again at $t_{ON}$ 220B.

Conventional VMS schemes would turn on switch 104 (that is, set control signal 106 HIGH) at the first valley 228A, which is prior to the desired switching timing 212. FIG. 2 illustrates an alternative valley switching scheme, whereby the primary side controller 102 can turn on the switch 104 at any time after the end of the transformer reset period $T_{RESET}$ 224A. In one embodiment, the primary side controller 102 can set the control signal 106 HIGH at the valley 228D that is immediately subsequent to the desired switch pulse 212.

Referring back to FIG. 1, the secondary side switch 128 is in parallel with the rectifier diode D2. If it is switched ON during the peak period of the transformer ringing, overlap and cross-conduction of the primary side switch with the rectifier diode are prevented. Valley mode switching of the secondary side switch 128 can be used to transmit a signal to the primary side as described above.

Figure 3:
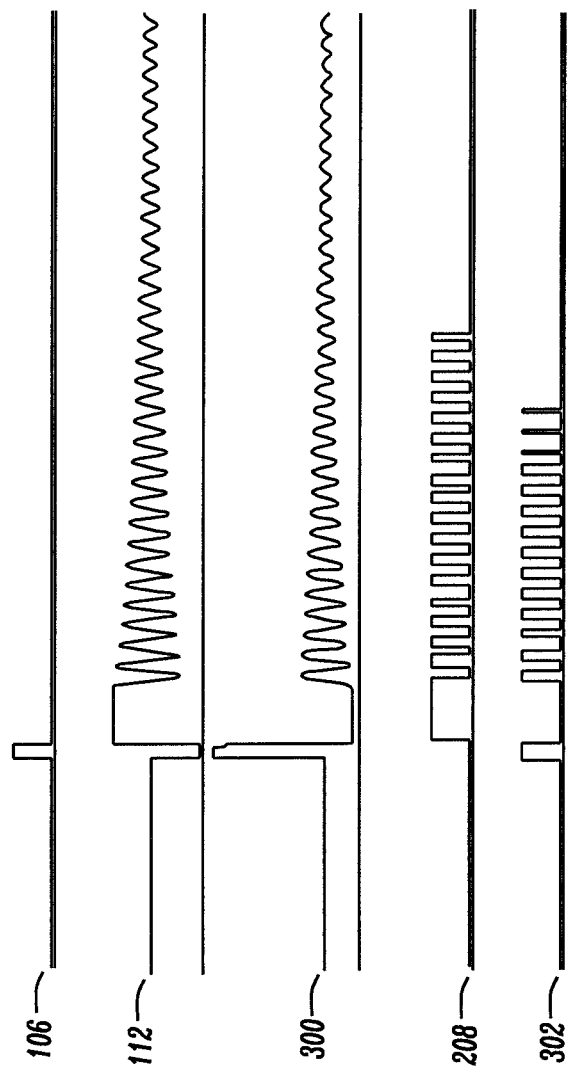
FIG. 3 illustrates further aspects of the operation of the circuit of FIG. 1, showing primary and secondary side transformer ringing together with valley mode switching signals.

Further aspects of the operation of the circuit of FIG. 1 are shown in FIG. 3, which shows aspects of the interaction between the primary and secondary sides. The figure shows the control signal 106, VSENSE 112 and primary side VVMS 208 signals as shown in FIG. 2, alongside the drain voltage 300 for the secondary side switch 128, and the valley mode switching comparator output 302 for the secondary side.

Figure 4:
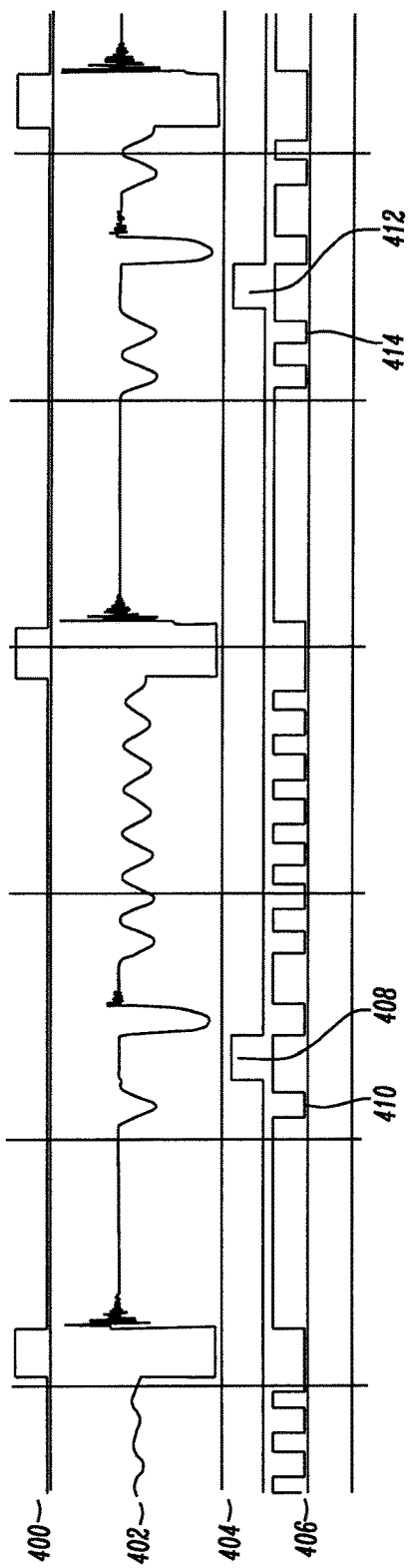
FIG. 4 shows a waveform of an example communication method according to the disclosure, which applies for pulse frequency modulation (PFM) and constant voltage (CV) modes of operation.

The waveform of FIG. 4 illustrates an example communication method according to the disclosure, which applies for pulse frequency modulation (PFM) and constant voltage (CV) modes of operation. The figure shows a regular control signal 400 (seen as control signal 129 in FIG. 1) for normal voltage regulation; the voltage 402 across the secondary side switch 128, a second control signal 404 (also seen as control signal 129 in FIG. 1) which is used for data transmission; and valley mode switching signal 406. The valley mode switch signal 406 is a timing signal internal to the secondary side controller 150 and is created with a comparator that monitors the Vds on the secondary side. A similar signal is also seen in the primary controller (102) based on the Vsense (112) signal.

The primary side controller operates as usual. The secondary side controller 150 detects the diode (or synchronous rectifier) conduction time. If the secondary side controller 150 needs to send a bit of information it will detect the valley switch and turn on the secondary side switch after the ringing peak for a period of time. In this example the switch 128 is left on for one ring period.

Therefore there are three possible messages that can be sent with each power supply switching cycle. They are (1) no data—no modulated ring period, (2) a first binary state (for example a "0") where the first peak of the ring is extend by one ringing period, and (3) a second binary state (for example a "1") where the second peak of the ring is extended by one ringing period.

This is illustrated in FIG. 4, which shows one pulse 408 occurring after a first peak 410 of one switching cycle to represent a binary "0"; and another pulse 412 occurring after a second peak 414 of another switching cycle to represent a binary "1".

This is just one example encoding method, and the present disclosure is not limited to any particular encoding method. For example, one could encode two bits per cycle by switching at one of four possible valleys instead of one of two possible valleys. Yet another example would be to extend the first or second peak, and extend it by one or two periods which would also give two bits per cycle. Different valleys and/or different peak extensions may be selected to represent different bit values.

Figure 5:
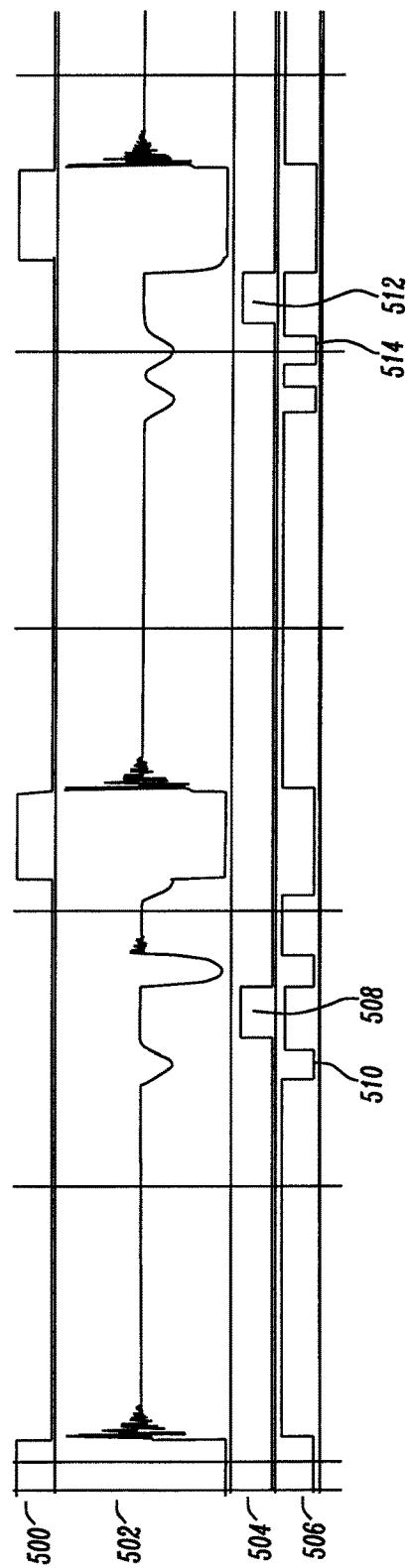
FIG. 5 shows a waveform of an example communication method according to the disclosure, which applies for a (near) critical discontinuous conduction mode (CDCM) mode of operation.

Communication in critical discontinuous conduction mode (CDCM) is similar, as illustrated in FIG. 5, which shows a regular control signal 500 (seen as control signal 129 in FIG. 1) for normal voltage regulation; the voltage 502 across the secondary side switch 128, a second control signal 504 (also seen as control signal 129 in FIG. 1) which is used for data transmission; and valley mode switching signal 506.

In similar fashion to that of FIG. 4, one pulse 508 occurs after a first peak 510 of one switching cycle to represent a binary "0"; and another pulse 512 occurs after a second peak 514 of another switching cycle to represent a binary "1".

In the CDCM mode, a communication pulse can only be detected if the primary side controller does not cause the signal 500 to turn on at the first valley of signal 502, because if it does, there will not be a first peak that can be extended. To ensure this the following algorithm is used:
1. The primary side controller operates in CDCM with valley hopping dithering. This means that it will switch either on the first or second valley.
2. If the secondary side controller has data to send it will wait for the switch cycle when the primary controller allows a full ring to happen. At that time, it initiates a pulse.
3. The primary side controller detects the first communication pulse and disables its own dithering. It will now wait to start the train for two ring periods after the reset time. It knows that the bits are sent in packets of known length, so it will remain in this mode until the whole packet (word) is received.
4. The primary side controller will determine an end of message after a certain (pre-set or required) number of bits are received, or when more than a certain number of cycles has passed where a switch pulse is not sent. The number of cycles can be set as a threshold, for example seven.

It is expected that sometimes the secondary side transmitter will not transmit a bit on every switch cycle. The above sequence allows for this but also provides a timeout that ensures resynchronization if the transmitter gets reset or otherwise restarted.

According to a further optional aspect of the disclosure, a "wake up" signal can be used in order to trigger communication from the secondary side to the primary side. This will be seen by the primary side which will cause it to immediately send a power conversion cycle. That power conversion cycle can be used as the start bit for a message. The wake up signal preferably takes the form of a short pulse. The pulse can be any suitable duration, but by way of example and without limitation the pulse may be of the order of 100 ns duration.

This technique means that the communication channel does not have to wait for the next transformer conversion cycle in order to start a message. This reduces communications latency, and can also be used as a sensor to send information to the primary side right away if there is a dynamic load increase. In this case it is necessary for the power converter to begin higher power cycles immediately. It would not ordinarily know this until the next natural cycle would occur. With this feature, the recovery from that transient can begin sooner; allowing for improvement of the dynamic transient response of the converter.

Figure 6:
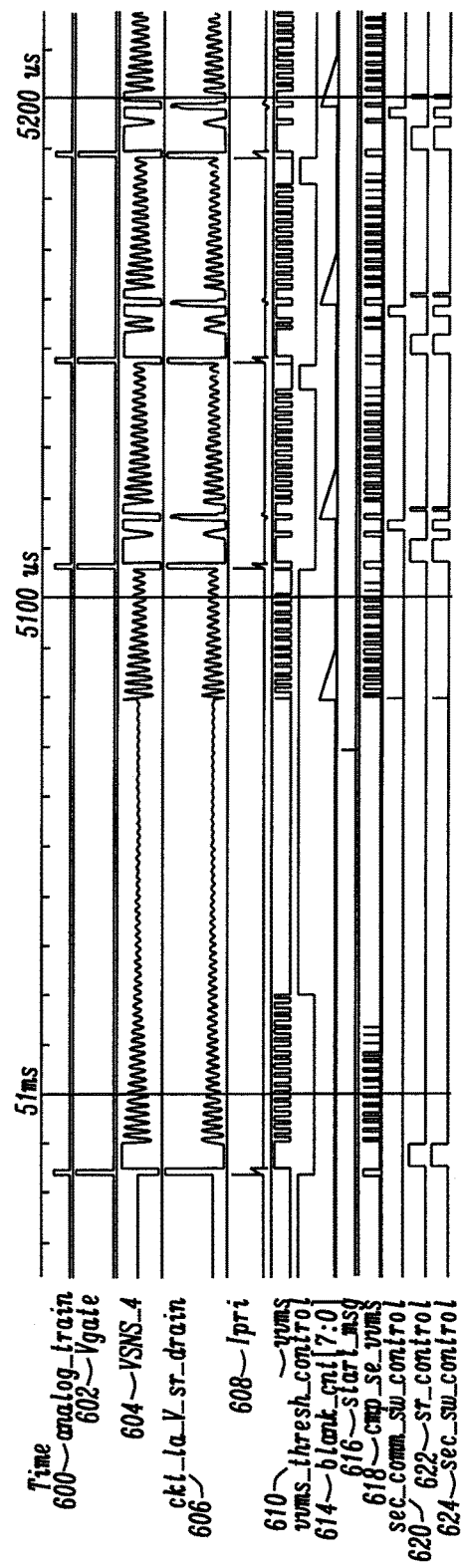
FIG. 6 illustrates an optional additional aspect of the disclosure, where communication from a secondary side to a primary side is triggered by a wake up signal.

FIG. 6 illustrates the operation of an isolated switching power converter of the type shown in FIG. 1 and which employs a wake up signal to trigger communication from the secondary to the primary side at any chosen time, without having to wait for the occurrence of a power conversion cycle.

FIG. 6 shows the digital control 600 (analog_train) of the primary side gate control, and the drain voltage 606 (clk_1a_V_sr_drain) for the secondary side switch 128. Valley locations of this signal 606 are sensed by a comparator on the primary side 610 (vvms) and a comparator on the secondary side 618 (cmp_sr_vvms). The Vsense signal 604 (VSNS_4) as seen from the primary side of the system on the auxiliary winding in to the Vsense pin 112 of the primary side controller 102 is also shown. On the primary side, the threshold of the vvms comparator can be changed according to threshold control signal 612 (vvms_thresh_control) to add noise immunity. This means the comparator output stops changing before the ringing fully subsides.

When a host (such as an electronic device 121) has a message to be sent, it can send a wake up signal 616 (start_msg) to the secondary side controller 150. The secondary side controller 150 then emits a pulse 620 (sec_comm_sw_control). This pulse intitiates ringing on all windings of the transformer. The capacitance on the primary side of the transformer resonates with the magnetizing inductance to cause the ringing. This ringing is then picked up by the primary side transformer and causes it to commence a power conversion cycle. The signal 620 is then used to add the transmitter communication bits by extending rings by turning on the secondary side switch 128.

FIG. 6 also illustrates the actual shape of the gate voltage 602 (Vgate) resulting from the train 600, and the primary current 608 (Ipri) charging the transformer magnetizing inductance. A blanking counter 614 (blank_cnt [7:0]) may also be provided, which prevents the secondary side transmitter from adding data pulses to transformer resets that were caused by its own previous data bits, making sure that it only extends the ring on resets that were caused by the primary side.

Also, for synchronous rectification, the signal 620 that adds the transmitter communication bits may be logical-OR'd with a synchronous rectification signal 622, the resulting combined signal 624 being transmitted to the gate of the secondary side switch 128.

Various modifications and improvements can be made to the above without departing from the scope of the disclosure.

What is claimed is:

1. An isolated switching power converter wherein a secondary side is valley mode switched to transmit data to a primary side, the isolated switching power converter comprising:
   a transformer including a primary winding coupled to an input and a secondary winding coupled to an output of the isolated switching power converter;
   a primary side switch coupled to the primary winding of the transformer;
   a secondary side switch coupled to the secondary winding of the transformer;
   a secondary side controller on the secondary side of the switching power converter which outputs a control signal for operating the secondary side switch;
   a primary side controller on the primary side of the switching power converter which outputs a control signal for operating the primary side switch;
   wherein:
   the secondary side controller monitors voltage across the secondary side switch and changes the state of the secondary side switch at a time corresponding to a transformer ringing valley, for the transmission of data to the primary side controller;
   wherein different times corresponding to different ringing valleys are selected to represent different bit values and the primary side controller monitors valley periods to receive data thus encoded by the secondary side controller;

wherein the change of state of the secondary side switch is maintained for a single ringing period to represent a data bit.

2. The isolated switching power converter of claim 1 wherein the primary side switch allows current flow through the primary winding of the transformer when the primary side switch is turned on, and wherein the primary side switch prevents current flow through the primary winding of the transformer when the primary side switch is turned off; and wherein the secondary side switch allows current flow through the secondary winding of the transformer when the secondary side switch is turned on, and wherein the secondary side switch prevents current flow through the secondary winding of the transformer when the secondary side switch is turned off.

3. The isolated switching power converter of claim 1, wherein the secondary side switch is coupled in parallel with a rectifier device.

4. The isolated switching power converter of claim 1, wherein the change of state of the secondary side switch after a first-detected valley represents a bit having a first logic value and the change of the switch after a second-detected valley represents a bit having the other logic value.

5. The isolated switching power converter of claim 1, wherein the secondary side controller waits until the primary side controller allows a full transformer ring to take place before changing the state of the secondary side switch.

6. The isolated switching power converter of claim 1, wherein, upon receiving a pulse from the secondary side, the primary side controller disables valley hop dithering until the remaining digital bits have been received.

7. The isolated switching power converter of claim 1, wherein the primary side controller determines an end of message if a predetermined number of bits are received, or if no bits are received after a certain number of transformer ringing cycles.

8. The isolated switching power converter of claim 1, wherein the secondary side is arranged to receive a wake up signal to trigger communication of data to the primary side.

9. The isolated switching power converter of claim 8, wherein the wake up signal causes ringing by pulsing of a secondary side transformer, which in turn causes the primary side controller to commence a power conversion cycle.

10. The isolated switching power converter of claim 1, comprising a flyback converter.

11. A method of transmitting data from a secondary side to a primary side in an isolated switching power converter by valley mode switching of the secondary side; wherein the isolated switching power converter comprises a transformer including a primary winding coupled to an input and a secondary winding coupled to an output of the isolated switching power converter; a primary side switch coupled to the primary winding of the transformer; and a secondary side switch coupled to the secondary winding of the transformer; and the method comprising the steps of:

monitoring voltage across the secondary side switch;

changing the state of the secondary side switch at a time corresponding to a transformer ringing valley, for the transmission of data to a primary side controller; wherein different times corresponding to different ringing valleys are selected to represent different bit values; and monitoring voltage across the primary side switch to receive data thus encoded by a secondary side controller;

maintaining the change of the state of the secondary side switch for a single ringing period to represent a data bit.

12. The method of claim 11, wherein the method comprising the steps of:

controlling the primary side switch to selectively allow current to flow through the primary winding of the transformer;

controlling the secondary side switch to selectively allow current to flow through the secondary winding of the transformer.

13. The method of claim 10, wherein the secondary side switch is coupled in parallel with a rectifier device.

14. The method of claim 10, wherein the change of state of the secondary side switch after a first-detected valley represents a bit having a first logic value and the change of the switch after a second-detected valley represents a bit having the other logic value.

15. The method of claim 10, wherein the secondary side controller waits until the primary side controller allows a full transformer ring to take place before changing the state of the secondary side switch.

16. The method of claim 10, wherein, upon receiving a pulse from the secondary side, the primary side controller disables valley hop dithering until the remaining digital bits have been received.

17. The method of claim 10, wherein the primary side controller determines an end of message if a predetermined number of bits are received, or if no bits are received after a certain number of transformer ringing cycles.

18. The method of claim 11, wherein the secondary side receives a wake up signal to trigger communication of data to the primary side.

19. The method of claim 18, wherein the wake up signal causes ringing by pulsing of a secondary side transformer, which in turn causes the primary side controller to commence a power conversion cycle.

20. The method of claim 11, wherein the isolated switching power converter comprises a flyback converter.

* * * * *